United States Patent [19]
Zavislan et al.

[11] Patent Number: 5,825,486
[45] Date of Patent: *Oct. 20, 1998

[54] ELECTRO-OPTIC MODULE ESPECIALLY SUITABLE FOR USE IN A SPECTROPHOTOMETER

[75] Inventors: James M. Zavislan; Jay M. Eastman; Robert J. Hutchison, all of Pittsford, N.Y.

[73] Assignee: Lucid Technologies Inc., Henrietta, N.Y.

[*] Notice: The term of this patent shall not extend beyond the expiration date of Pat. No. 5,742,389.

[21] Appl. No.: 831,826

[22] Filed: Apr. 2, 1997

Related U.S. Application Data

[63] Continuation of Ser. No. 322,244, Oct. 12, 1994, Pat. No. 5,742,389, which is a continuation-in-part of Ser. No. 210,806, Mar. 18, 1994, abandoned.

[51] Int. Cl.⁶ ........................................................ G01J 3/28
[52] U.S. Cl. ............................................. 356/326; 356/328
[58] Field of Search ..................................... 356/326, 328, 356/330–334, 402–411, 319; 250/226; D10/80, 81, 46, 76

[56] References Cited

U.S. PATENT DOCUMENTS

| | | |
|---|---|---|
| 3,216,313 | 11/1965 | Chisholm . |
| 3,244,879 | 4/1966 | Hall, Jr. . |
| 3,377,817 | 4/1968 | Ralston . |
| 3,614,227 | 10/1971 | George . |
| 3,822,941 | 7/1974 | Roche et al. . |
| 3,915,571 | 10/1975 | Winter . |
| 3,917,903 | 11/1975 | Chupp et al. . |
| 4,040,741 | 8/1977 | Swift . |
| 4,326,802 | 4/1982 | Smith et al. . |
| 4,531,836 | 7/1985 | Smith et al. . |
| 4,623,251 | 11/1986 | Povey . |
| 4,726,657 | 2/1988 | Perkins et al. . |
| 4,752,130 | 6/1988 | George et al. . |
| 4,838,691 | 6/1989 | Master et al. . |
| 4,844,602 | 7/1989 | Kitagishi et al. . |
| 4,895,445 | 1/1990 | Granger . |
| 5,024,529 | 6/1991 | Svetkoff et al. . |
| 5,055,684 | 10/1991 | Honigs . |
| 5,071,250 | 12/1991 | McGee . |
| 5,074,666 | 12/1991 | Barnes et al. . |
| 5,162,868 | 11/1992 | Ando . |
| 5,192,981 | 3/1993 | Slutter . |
| 5,268,737 | 12/1993 | Fukuma et al. . |
| 5,272,518 | 12/1993 | Vincent . |
| 5,274,435 | 12/1993 | Hettrick . |
| 5,400,138 | 3/1995 | Peterson et al. . |
| 5,479,258 | 12/1995 | Hinnichs et al. . |

FOREIGN PATENT DOCUMENTS

| | | | |
|---|---|---|---|
| 61193031 | 8/1986 | Japan | 356/334 |
| WO9412856 | 6/1994 | WIPO | 356/319 |

OTHER PUBLICATIONS

D. J Schroeder, J. Opt. Soc. Ameri. 6081022, Aug. 1970.

*Primary Examiner*—K. Hantis
*Attorney, Agent, or Firm*—M. Lukacher; K. Lukacher

[57] ABSTRACT

A spectrophotometer which is highly manufacturable at minimum cost nevertheless provides precision of measurement of spectra components of light which is projected therein by maintaining precise optical alignment of optical and electrical components thereof. These components are mounted in a module which is contained in a housing having an entrance aperture which defines an object area for light the spectrum of which is measured by a photodetector in the module at an image area. The module has a base plate provided by a printed circuit board on which a closed wall encompasses an area (a corral) on one side of the circuit board. The wall is a one piece structure which extends to the vicinity of the edge of the board. It is assembled with the board as a unitary structure so that the assembly is made torsionally rigid and resists bending in the plane of the board. The module may be of sufficiently small size so as to be located in a housing which is hand held, thereby providing a hand-held spectrophotometer.

5 Claims, 12 Drawing Sheets

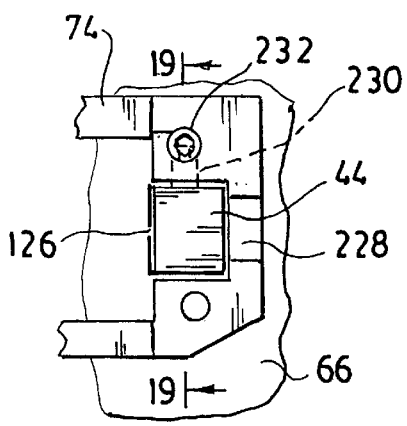
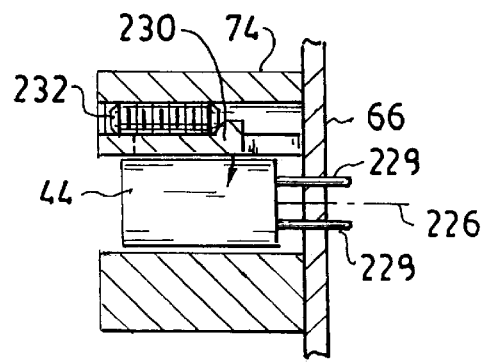
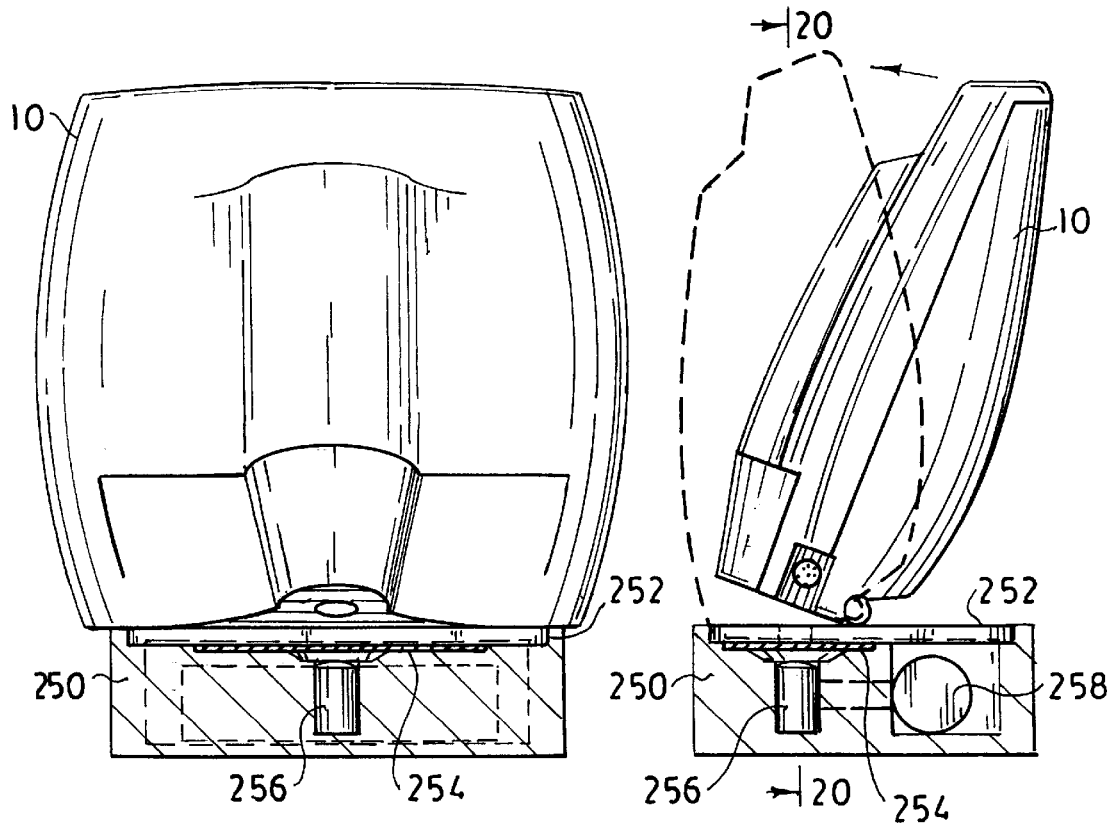

ELECTRO-OPTIC MODULE ESPECIALLY SUITABLE FOR USE IN A SPECTROPHOTOMETER

This is a continuation of application Ser. No. 08/322,244 filed Oct. 12, 1994, now U.S. Pat. No. 5,742,389 issued Apr. 21, 1998, which is a continuation in part of application Ser. No. 08/210,806 filed Mar. 18, 1994 now abandoned.

DESCRIPTION

The present invention relates to spectrophotometers, and particularly to a spectrophotometer the electrical and optical components of which are part of an electro-optical module which is sufficiently dimensionally stable to locate the components in aligned relationship to enable precision spectral measurements.

The spectrophotometer provided by the invention may be sufficiently small sized to be hand held and by virtue of the modular construction is manufacturable at minimum cost, while affording requisite dimensional stability for precision alignment of optical and electrical components thereof. Electro-optical modules provided in accordance with the invention may find applications in instruments of various types where precise alignments and manufacturability are required and also where resistance to forces in handling and operation, such as where the instrument is portable, and especially where it is adapted to be held in the hand of the operator, are needed.

It has been discovered, contrary to established practice in the optical arts, that sufficient precision can be obtained in an optical assembly without massive structures such as castings on or in which optical components are mounted in order to obtain the necessary precise alignment of the components. It is also been discovered that the necessary alignment can be obtained in a module having a minimum number of parts and achieved without significant trimming or adjustment fixtures. Thus a spectrophotometer can be constructed using a module which contains a moveable dispersive element, a actuator such as a motor for moving the element, mirrors and an imaging lens which defines the light paths for precisely imaging different spectral components on an image area where the components can be translated into electrical signals by a photodetector responsive to light passing through the image area.

Generally, the module may comprise a base plate such as a printed circuit board, which in and of itself is flexible and can bend in the plane of the board. A wall is assembled to the base plate on one side thereof and surrounds a area by defining a corral sufficient in size to contain a plurality of electrical and optical components in assembled relationship with at least one of the plate and the wall. The plate and the wall becomes a structure more rigid than the plate or the wall alone and can withstand forces, such as due to shock, while maintaining the alignment of the optical and electrical components with sufficient precision for the application. Where the application is spectrophotometry the components may include a dispersive element (such as a grating) and an arm which is pivotally mounted on a journal provided by the wall, in the corral. The arm may have a portion which is maintained in tension between the journal and the shaft of a motor which moves the arm and tilts the dispersive element to enable the lens to image different spectral components, which extend over discrete wavelength ranges, such as 10 nanometers (nm), at the image area. Another wall which is integral with the wall defining the corral may be used to further strengthen the module and to provide a light corridor between the dispersive element and the image area which may contain the lens and exclude portions of the spectrum of the light dispersed by the dispersive element outside the discrete spectral ranges corresponding to the inclination of the dispersive element.

Accordingly, it is an object of the invention to provide an improved electro-optical module.

It is a further object to provide an improved electro-optical module which does not require high tolerance precision parts, but can be based on a printed circuit board and a wall assembled to the board on one side thereof for structural rigidity and precise location of the electrical and optical components of the module.

It is a still further object of the present invention to provide an electro-optical module wherein the number of parts is minimized so as to facilitate manufacturability and reduce cost of manufacture.

It is a still further object of the present invention to provide an electro-optical module which is dimensionally stable and can withstand handling forces such as may be encountered during portable hand-held operation.

The foregoing and other objects, features and advantages of the invention will become more apparent from a reading of the following description in connection with the accompanying drawings in which:

FIG. 3A is a fragmentary sectional view taken along the line 3A—3A in FIG. 3;

FIG. 18 is a enlarged view of the area containing the photodetector which is circumscribed by the line 18—18 in FIG. 3;

FIG. 19 is a sectional view taken along the line 19—19 in FIG. 18;

FIGS. 20 and 21 are front and side views of the spectrophotometer which is provided with a foot structure containing a transparency for obtaining the spectrum of light transmitted through the transparency;

Figure 1:
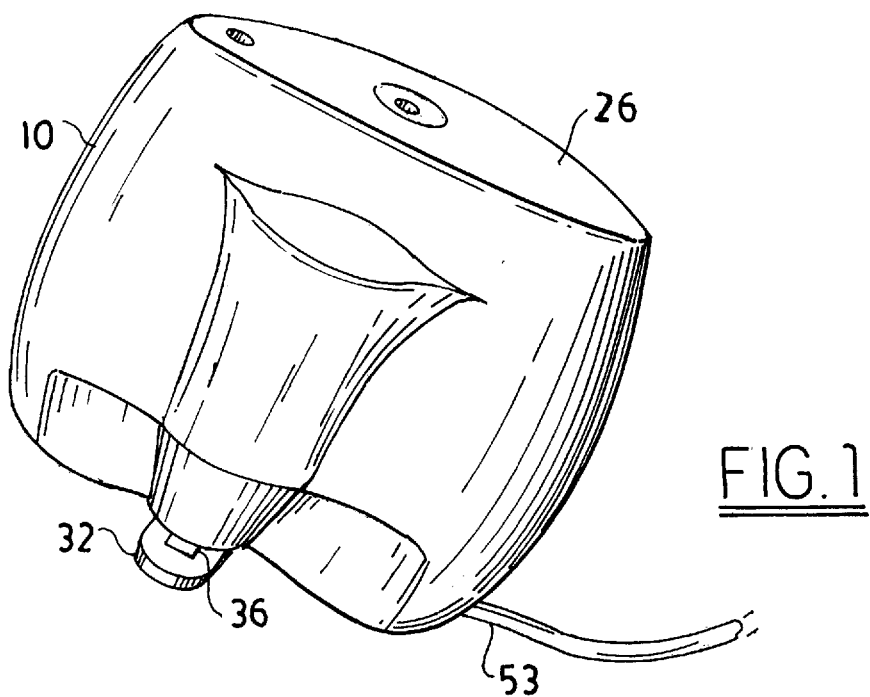
FIG. 1 is a perspective view of a spectrophotometer embodying an electro-optical module, the module and the spectrophotometer being in accordance with a presently preferred embodiment of this invention.
Figure 2:
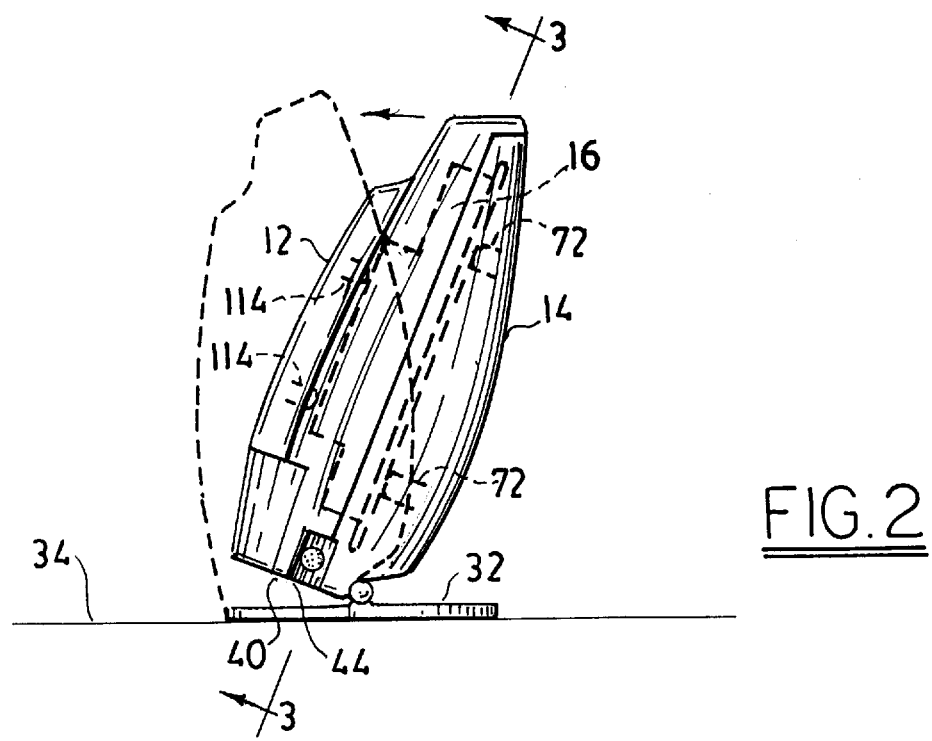
FIG. 2 is a side view of the spectrophotometer shown in FIG. 1 in which the position of the electro-optical module as indicated in dash lines, is disposed internally within the casing of the spectrophotometer.
Figure 3:
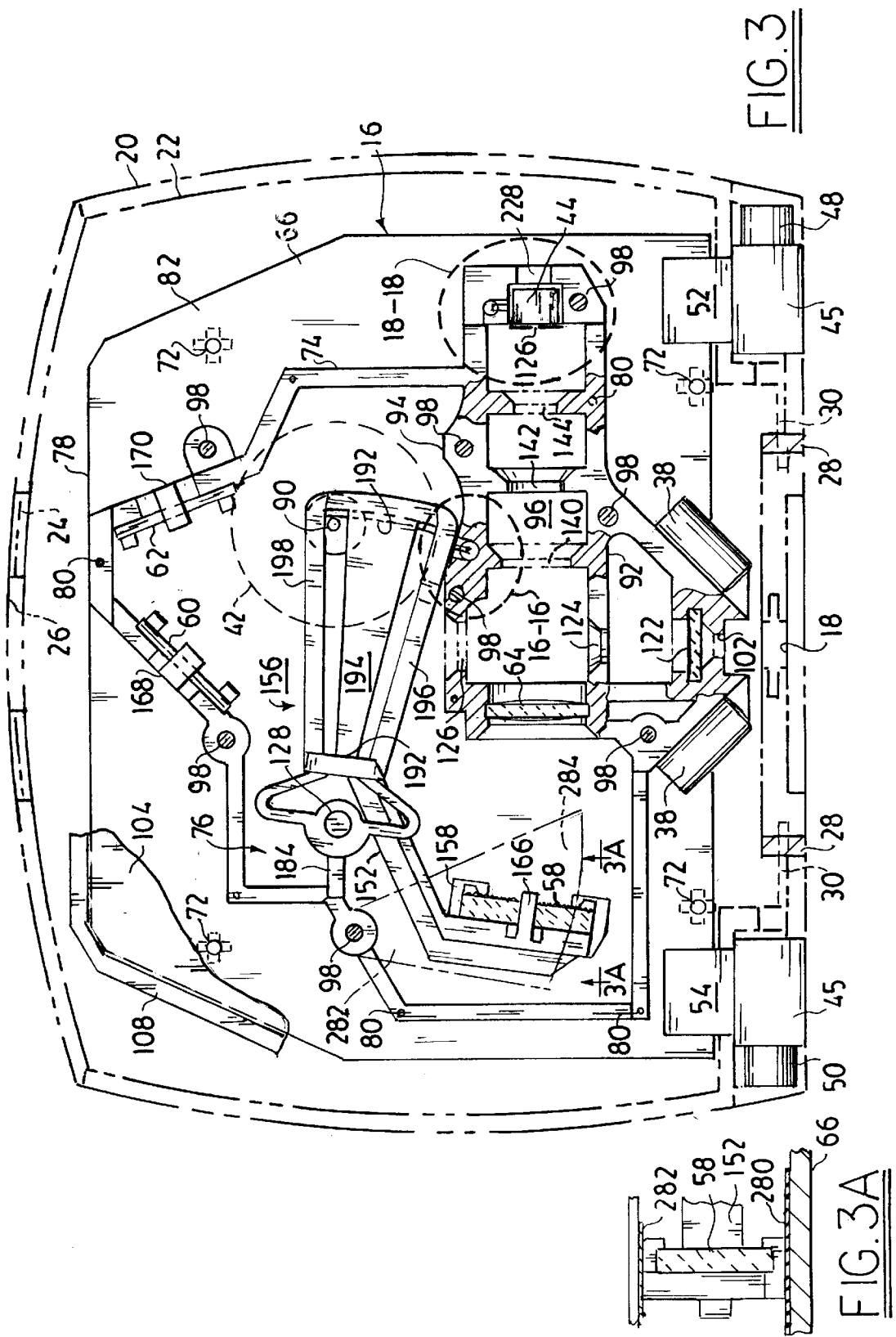
FIG. 3 is a sectional view of the spectrophotometer shown in FIG. 2 taken along the lines 3—3 and showing the electro-optical module contained therein.
Figure 4:
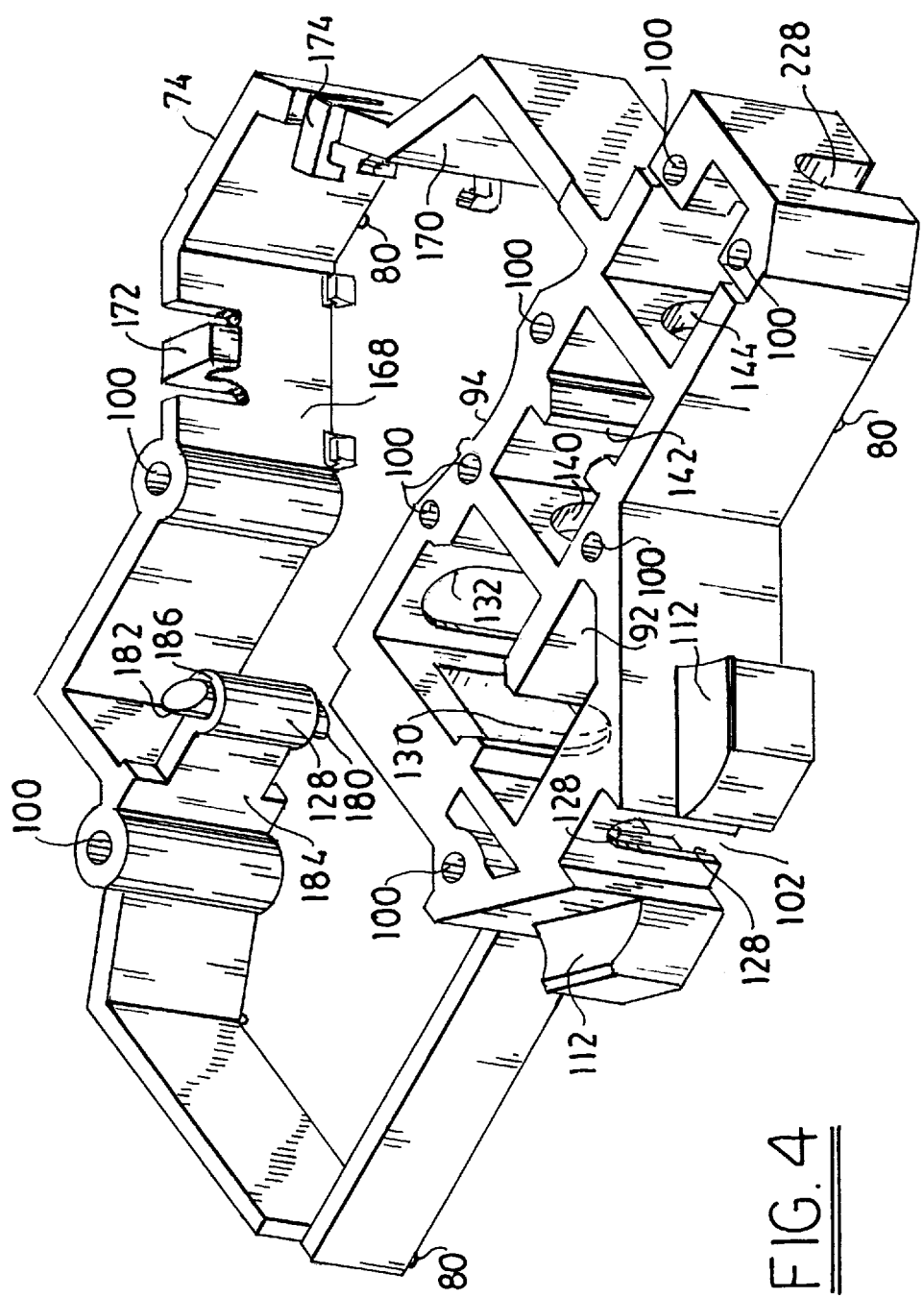
FIG. 4 is a perspective view of the monolithic molded plastic part providing the wall structure of the module shown in FIG. 3.

Referring to FIGS. 1–7, there is shown a spectrophotometer having a casing 10 which is adapted to be hand held. The casing is made up of two shells 12 and 14 which, when closed as shown in FIG. 2, enclose an electro-optic module 16 which contains the optical and electrical components of the spectrophotometer. The shells have overlapping edges 20 and 22 so as to define a light tight casing having an entrance aperture 18 for light from an object. The shells are removably connected by tongue and groove members 24 which form a hinge at the rear end 26. When the shells are brought together, posts 28 in one of the shells 12 enter into slots in the other shell 14. A pin 30 extending through the posts holds the shells closed in a position shown in FIG. 2. The pin provides a journal for a foot plate 32, which may be located on the object 34 for a spectral measurement when the object 34 is illuminated by light from the spectrophotometer and reflected from the object. The foot plate has a snap in journal which engages the pin 30. An aperture 36 in the foot plate makes the object 34 visible when the casing 10 is pivoted away from the foot plate on the pin 30, as shown in FIG. 2. The aperture 36 is in alignment with the aperture 18 through which the object is illuminated by lamps 38 in the module 16. The illumination then passes through the aperture 18 and the operator is able to view that the area of the object being illuminated.

Then the front end 40 is pivoted down against the foot plate 32 to the position shown in FIG. 2. The foot plate may also operate a switch, which may be an electro-optical switch including a light emitting diode and photodetector which detects when the casing 10 is tilted to the vertical operating position, as shown by the dash lines in FIG. 2, to start a spectral measurement.

Figure 5:
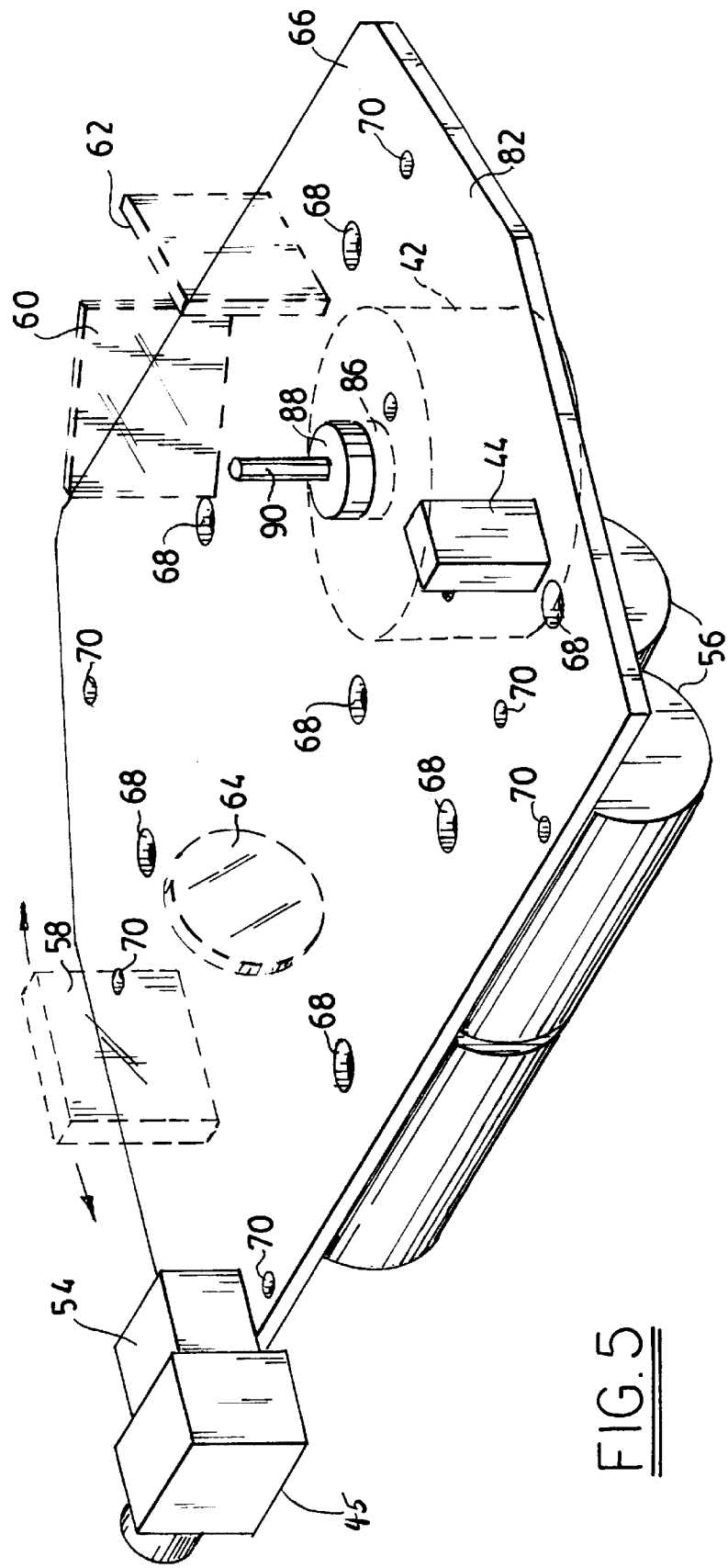
FIG. 5 is a schematic diagram generally showing the location of the electrical and optical components of the module illustrated in FIG. 3 on the printed circuit board thereof.

The module contains a motor 42 (an electrical component) and a photodetector 44 (also an electrical component). Another electrical component is the lamps 38. Other components such as integrated circuit chips, resistors, capacitors, transistors and the like are contained in the module and are connected to external equipment, such as a host computer by connectors 45 which are captured in cavities 48 and 50 formed when the shells are closed. These connectors extend in opposite directions and may receive a plug at the end of a cable 52 which can be inserted into either of these connectors 45 or 46 depending upon whether right hand or left hand operation of the spectrophotometer is desired. These connectors 45 have contacts on the sides thereof which are inserted into mating contacts in connectors 52 and 54 which are mounted on the module 16. These connectors 52 and 54 may be connected in parallel so that either of the left or right side connectors 45 may be used to receive the plug at the end of the cable 53 which ever is convenient. One of these connectors 45 and the connector 54 of the module are shown in FIG. 5. FIG. 5 also shows the photodetector 44 and batteries 56. The optical components of the module include a movable dispersive element, namely a reflection grating 58, light folding mirrors 60 and 62 and a focusing lens 64.

The module 16 has a base plate 66 which is conventional printed circuit board made of epoxy based resin which is approximately ⅛" in thickness. The board has circuit traces thereon and holes, the larger ones 68 are through screw holes and the smaller ones 70 receive alignment stubs on posts 72 (FIGS. 2 and 3) which index and orient the module 16 in the casing 10. Some of these holes also orient a wall structure (wall) 74.

Figure 11:
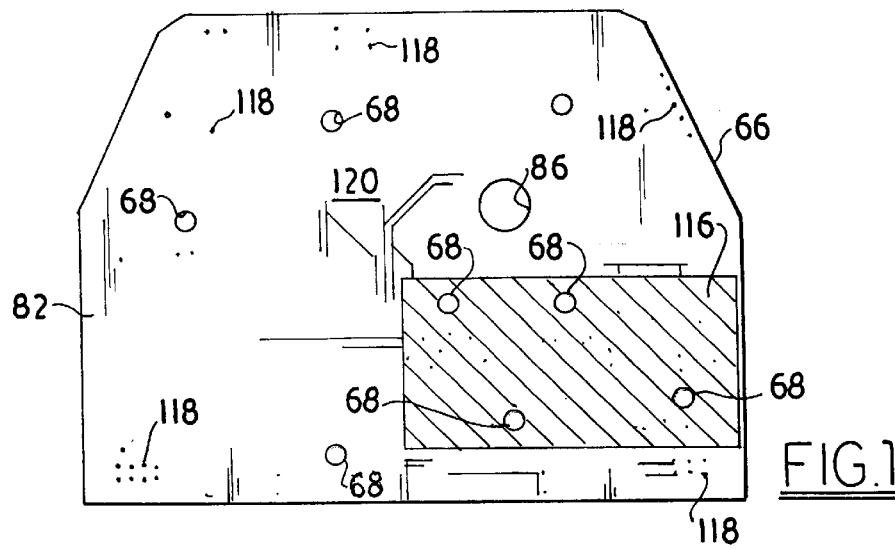
FIG. 11 is a simplified plan view of the top surface of the printed circuit board of the module.

The wall 74 is a single, unitary part of the module which circumscribes an area 76 on the board 66. The sides of this wall 74 form a corral in which the optical components, namely the grating 58, the mirrors 60 and 62 and the lens 64 are disposed, and also in which or on which the electrical components, namely the motor 42, the photodetector 44 and the lamps 38 are mounted. The wall 74 is like a rib which extends to the vicinity of the edges of the board 66 and in some cases (at the rear edge 78) directly thereto. The wall has projecting stubs or alignment pins 80 which enter some of the alignment holes 70 on the board 66 so as to index the wall 74 on the upper side surface 82 of the board. The top (the side in contact with wall 74) side surface 82 of the board is shown in FIG. 11, which indicates some of the circuit traces. There is hole 86 for one of the bearings 88 of the motor 42 through which the motor shaft 90 extends through the upper surface 82 of the board 66.

The wall structure includes other walls 92 and 94 which define a light corridor 96. The photodetector 44 is located at an end of the corridor distal from the grating 58 while the lens 64 is located at the end of the corridor just proximal to the grating 58.

The wall 74 and the walls 92 and 94 which define the light corridor are disposed inwardly of the wall 74 in the corral to form a rigidifying structure. Even though the wall 74 and the board 66 are flexible and may bend in the plane of the board or in the case of the wall 74 laterally (transversely) to the plane of the board, when assembled together by screws 98 which extend through holes 100 which are in alignment with the holes 68 in the board 66, a unitary structural assembly is provided which is rigid both torsionally, against bending in the plane of the board 66 and against compressive stresses, either laterally against the walls or perpendicular to the board.

Preferably the wall is made of a dimensionally stable plastic material, for example, a glass filled polymer such as an etherimide sold under the trademark ULTEM by General Electric Company of Pittsfield, Mass., USA which is a presently preferred plastic material. The wall 74 and the corridor 96 is a one piece structure which is moldable. The molding contains the glass distributed homogeneously throughout the plastic structure to afford dimensional stability. By virtue of the dimensional stability, the optical and electrical components, namely the grating 58, the mirrors 60 and 62, the lens 64 and the photodetector 44 are precisely positioned.

Figure 7:
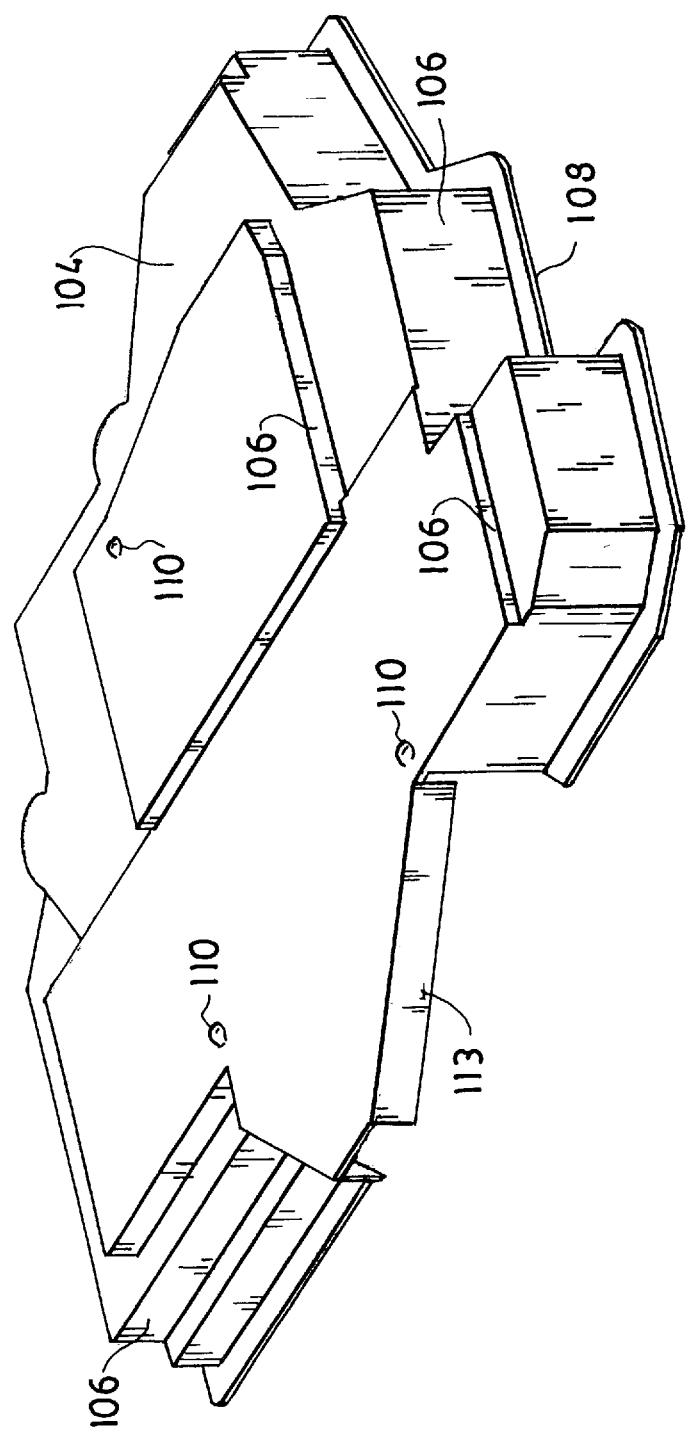
FIG. 7 is a perspective view illustrating the cover of the module shown in FIG. 3.

The module 16 is closed by a cover 104 (see FIG. 7) having sides 106 which parallel the sides of the wall 74 and have steps 106 to provide clearance for the components in the corral 76 as well as to clear the inner periphery of the shells 12 and 14, when they are closed to form the casing 10. The cover has a rim 108 which extends beyond the edge of the board 66 when the cover is placed over the board. This rim is flexible and protects against lateral shock forces, for example, if the spectrophotometer is dropped by the operator. The cover 104 may be held down against the wall by the same screws 98 which enter some of the holes 100 in the wall 74. Holes 110 for three such screws are shown in FIG. 7. The cover is preferably made of plastic (e.g. polystyrene). Since the front lip 112 of the cover is spaced from the lamps 38, a high temperature plastic need not be used. The lamps themselves are held in receptacles 112 on the wall 74. The material of the wall is temperature resistent plastic and can withstand the heat generated by the lamps 38 which may be incandescent lamp bulbs. As shown in FIG. 2 there are posts 114 projecting downwardly from the inner periphery of one of the shells 12 against the cover so as to located the module and prevent from moving between the shells 12 and 14. The resilience of the cover also provides shock resistance against forces on the shells.

The cover is preferably of opaque material (black) so as to prevent the entry of stray light into the spectrophotometer. Also the top surface 82 of the board 66 has a coating of black material, such as ink, silk screened over an area 116 at least of an extent underlying the corridor 96. This ink may be screen printed over a non-conductive coating which acts as a solder mask over the traces and conductors extending through the bottom 84 of the board. Some small holes 118 are shown as examples of small openings of the board 66 through which conductors from integrated circuit chips and other electrical components may extend and connect to the traces on the board. Exemplary traces are shown at 120 in FIG. 11.

Figure 12:
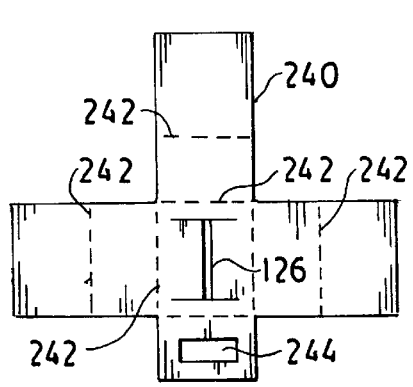
FIGS. 12, 13 and 14 are views of the structure forming an image area aperture slit on the photodetector in the module shown in FIG. 3.
Figure 13:
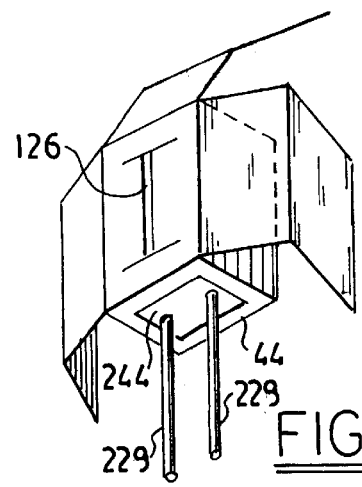
Figure 14:
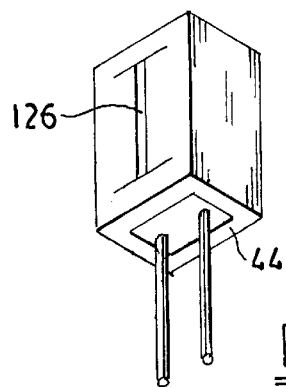

The front end of the wall has an entrance aperture 102 which is covered by a transparent protective (against infiltration of dust and the like) plate 122, which is disposed in a slot molded into the front wall behind the aperture 102. The aperture 102 and apertures 124 and 126 define a diverging beam of light since their width becomes progressively larger along a path from the entrance aperture to the mirror 60. The beam is reflected at the mirror 60 to the mirror 62 and thence to the grating 58. The beam is then deflected along the path perpendicular to the path to the mirror 62 and is directed along the optical axis of the lens 64 to an image aperture 126 of the photodetector 44. The grating 58 rotates about an axis of a journal 128 which is perpendicular to the board 66. The image aperture 126 is shown in FIGS. 12 to 14 and is a slit parallel to the axis of rotation. The slit aperture 126 is intersected and bisected by and perpendicular to the optical axis of the lens 64. The lens 64 images a conjugate of the entrance or object aperture 102 at the image aperture 126. The beam is permitted to diverge by the apertures 124 and 126 SO that the lens 66 aperture (effective diameter of the lens) is filled by light deflected by the grating. Only the component along the optical axis is of the wavelength which is being measured. Accordingly by tilting or inclining the grating, different spectral ranges or components are imaged at the image aperture 126 and converted by the photodetector 44 into electrical signals representing the intensity of the discrete spectral components corresponding to the different angular inclination of the grating.

The apertures 102, 124 and 126 are defined by archways formed by oppositely directed (with respect to board 66) slots 128, 130 and 132, the archways are generally hemi-circular such that the projection of the oppositely directed archways, some being convex and the others concave, on the mirror 60 defines a circular aperture. Thus effectively oval apertures are provided in the molded wall structure in the wall 74 and the corridor walls 92 and 94 without the need of special multi-slide molds. Accordingly, the wall structure is readily manufacturable at low cost.

The corridor is also provided by a series of archways 140, 142 and 144 which progressively decrease in width along the optical axis from the lens 64 to the detector 44. These archways have semi-circular tops and their projection on the detector is effectively a circular aperture which is formed without the need for special molding techniques. The apertures are defined by baffles which extend laterally from the walls 92 and 94 and prevent light which is not being focused by the lens along the optical axis to the image aperture 126 from reaching the image aperture. This light may contain spectral components other than the spectral component which is directed along the optical axis. Accordingly, the apertures 102, 124 and 126 provide beam shaping by trimming or vignetting the beam which diverges as it is directed to the grating 58. The apertures 140, 142 and 144 also provide baffling or vignetting of the beam which is deflected from the grating 58 and focused by the lens 64 at the image aperture 126.

The lens 64 is selected to have a dispersion which compensates for the anamorphic magnification of the grating which shifts the distance of a virtual image of the object aperture 102 from the lens 64. This shift depends upon the angle of inclination of the grating 58 and the physical distance between the object aperture 102 from the grating. This is the distance along the path between the aperture 102, the mirror 60, the mirror 62 to the grating 58. This path is shown by the dash lines in FIGS. 8, 9 and 10 for different inclinations of the grating 58. Thus, the image that the lens sees is shifted longitudinally with respect to the optical axis of the lens depending upon the inclination of the grating and the physical distance by which the grating 58 is spaced from the lens 64. This shift in the longitudinal position of the image on the lens is compensated by selecting the dispersion in the lens, much like compensation for longitudinal chromatic aberration. Using a lens adds flexibility in forming a compact package since the geometrical relationships which satisfy mechanical and packaging conditions can be accommodated by the dispersion in the lens. The V or Abbe number of the lens which defines its dispersion can then be chosen to achromatize the system. Using a lens increases the efficiency of the system, since those are no reflective coatings on the focussing element to decay with time or environmental degradation. Also with proper choice of the lens material (glass), transmission through the lens (the focussing element of the system) can approach 100%, which is not obtainable with broad band reflective focussing elements, especially in the ultraviolet.

The lens 64 is selected in accordance with the geometrical disposition of the path of light in the spectrophotometer with respect to the grating and the inclination of the grating and the wavelength which the lens focuses for that inclination at the image aperture in accordance with the following formula $$V = \frac{-f}{\Delta F} \quad (1)$$

where f is the focal length of the lens 64 to focus of aperture 102, the image aperture slit 126, for the nominal central wavelength, $\lambda_c$=589 nm.

$$\Delta F = \frac{1(\lambda_l)\, 1'}{1(\lambda_l) + 1} - \frac{1(\lambda_h)\, 1'}{1(\lambda_h) + 1} \quad (2)$$

$\lambda_l$ and $\lambda_h$ are the wavelengths at the low and high ends of the wavelength spectra which is measured by the spectrophotometer (e.g. $\lambda_l$=486.1 nm and $\lambda_h$=656.3 nm;

l and l' are the distances from first and second principal planes of the lens to the detector slit, respectively.

The first principal plane is perpendicular to the optical axis and approximately tangential to the lens surface facing the image. The second principal plane is similar, but on the side of the lens facing the detector slit 126.

Figure 24:
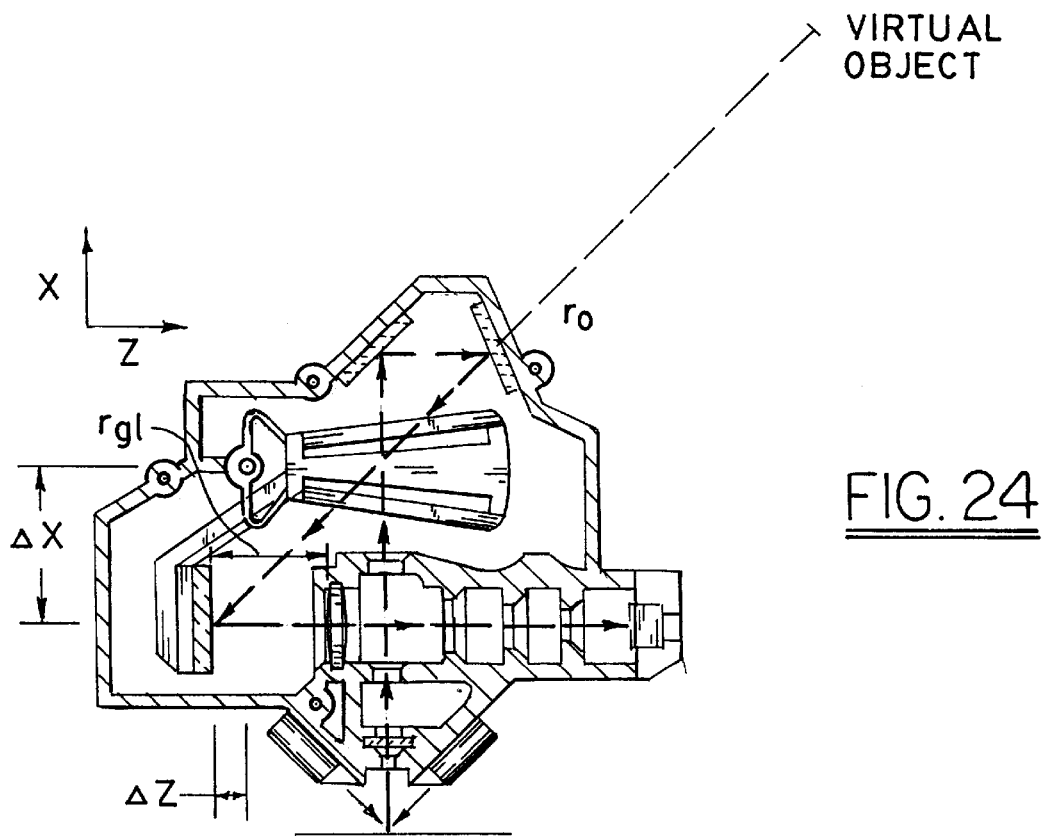
FIGS. 24 and 25 are like FIGS. 9 and 10, but are marked with the geometrical parameters considered in selecting the dispersion of the lens for correction of longitudinal chromatic aberration in the spectrophotometer.
Figure 25:
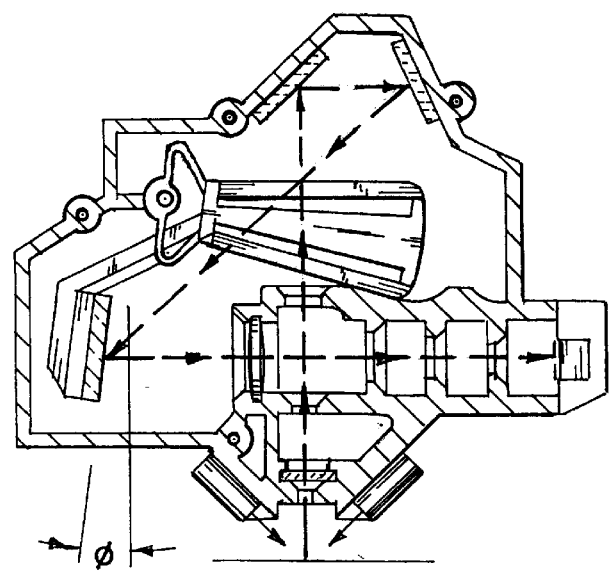

$l(\lambda)$ is the effective object distance at wavelength ($\lambda$), and depends on the inclination of the grating 58. The geometry is shown in FIGS. 24 and 25, which are like FIGS. 9 and 10, but marked with the geometrical parameters $$1(\lambda) = \frac{\frac{\sqrt{2}}{2} r_o}{\sin(\alpha(\lambda) + \phi(\lambda))} + r_{g1} - \Delta Z + \Delta X \tan(\theta - \phi(\lambda))$$

where $\alpha(\lambda)$, $\phi(\lambda)$ and $\lambda$ are related by $$\alpha = \left[ \tan^{-1}\left( \frac{\frac{\sqrt{2}}{2} r_o}{\frac{\sqrt{2}}{2} r_o - \Delta Z + \Delta X \tan(\theta - \phi)} \right) - \phi \right]$$

$$\lambda = d(\sin\alpha - \sin\phi)$$

$\phi$ is the angle of diffraction; also defined as the grating scan angle. See FIG. 25.

d is the grating period spacing.

$\Delta X$ is the X pivot offset of the grating arm pivot relative to the optical axis of the lens. See FIG. 24.

$\Delta Z$ is the Z pivot offset of the grating surface to the grating arm pivot when the grating normal is parallel to the optical axis of the lens.

$$\theta = \tan^{-1} \frac{\Delta Z}{\Delta X}$$

$r_{g1}$ is the distance from the grating surface to the first principal plane of the lens measured along the lens axis. In a presently preferred embodiment
$\Delta X$=24.230 mm
$\Delta Z$=6.163 mm
d=833.333 nm
$r_{g1}$=19.108
$r_0$=141.840
$l^1$=46 mm For this embodiment, the Abbe number is V=32.5. Representative glass include, but are not limited to, Schott glass SF-2 and SF-12.

The grating 58 is mounted in a bracket 150 on an arm structure 152 which is rotatable on the journal 128. The arm has two parts, namely a strut 154 and a tensioned section 156, which is disposed between the journal 128 and the motor shaft 90. The strut 154 carries the bracket 150. The grating 58 is a plate which rests on feet 158 and 160 which form receptacles 162 and 164. These receptacles are spaced from a flexible finger 166 hooked at its free end. To assemble the grating in the bracket 150 the bottom edge of the grating is placed within the receptacles 162 and 164 and the grating pushed backwardly to flex the finger 166 upwardly. When the grating 58 passes through the hook end of the finger 166, the finger returns to its downward position and latches the grating in place. The mirrors 60 and 62 are also assembled to the wall 74 by similar brackets 168 and 170 formed in sections of the wall 74. The mirrors are placed in receptacles extending from the bottom of these brackets 168 and 170 and snapped over fingers 172 and 174 having hooks at the end thereof like the finger 166 which holds the grating 58.

Figure 6:
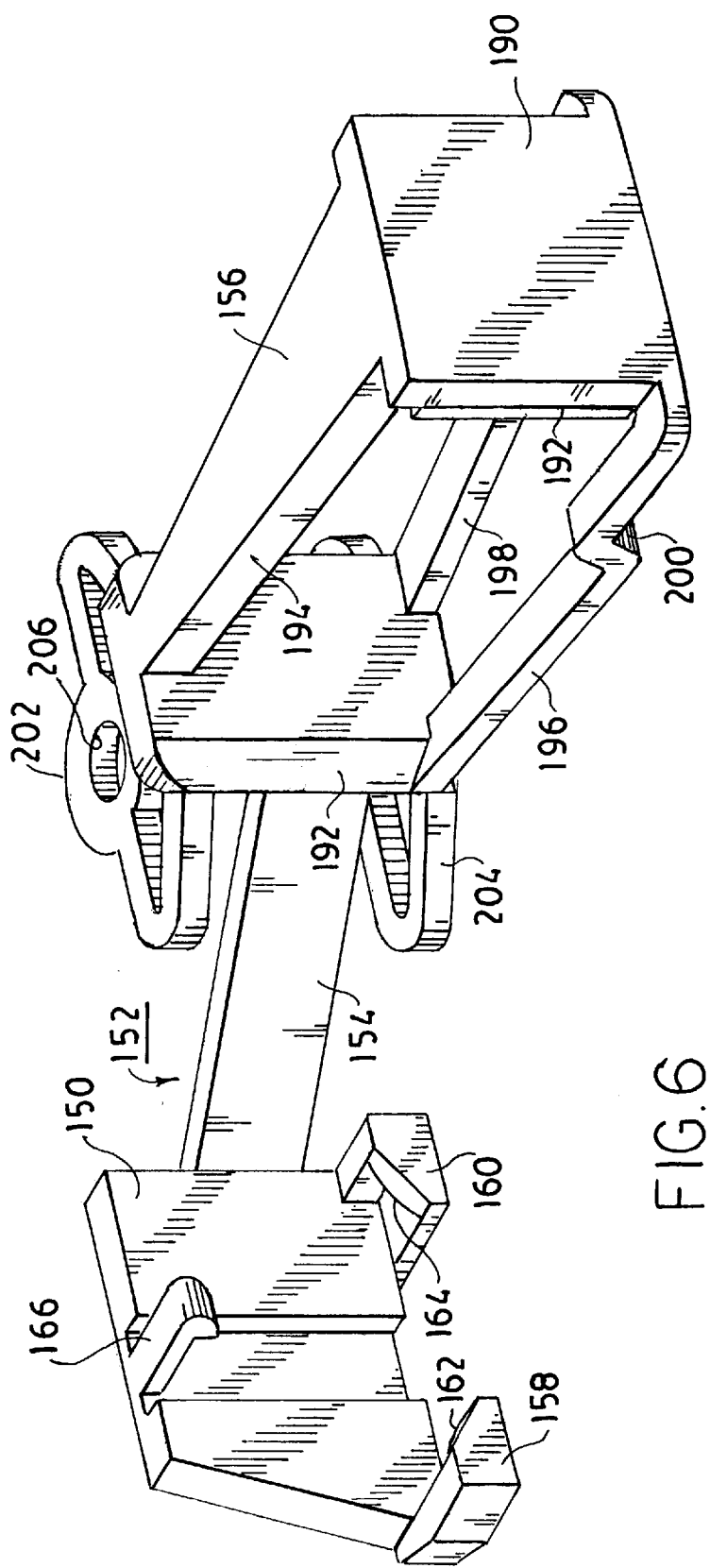
FIG. 6 is a perspective view of the arm which is rotated by the motor and contains the dispersive element (a reflection grating), of the module shown in FIG. 3.
Figure 15:
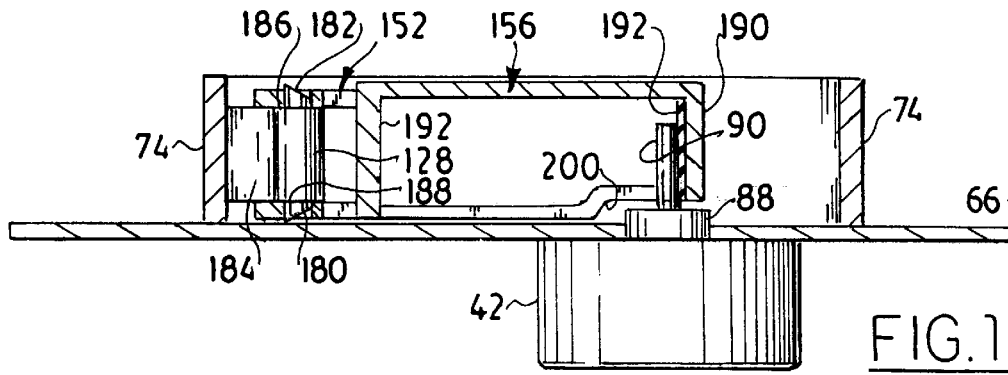
FIG. 15 is a sectional view illustrating the tensioned part of the arm, the view being taken along the line 15—15 in FIG. 9.

The arm 152 is also shown in FIGS. 6 and 15 where it is pivotally mounted to the journal 128. The journal is located by a strut 184 which connects to a cylinder from which posts 180 and 182 extend in opposite directions. These posts are champhered so that their inside is closer to upper and lower surfaces 186 and 188 than the back side of these posts 180 and 182. The back or longer sides of these posts are further from the motor shaft 90 than the front sides thereof. It is between the posts 180 and 182 and the motor shaft that the arm 152, and particularly the section 156 thereof, is held in tension.

This section 156 has a rim 190 on the inside of which is a pad 192 of resilient material from a suitably urethane, rubber, such as having a hardness of approximately Shore A-65. It is against this pad that the motorshaft 90 bears. The rim 190 is connected to a hub 192 by spokes 194, 196 and 198. These spokes are struts which are thin and are spaced from each other so as to permit the illumination from the object aperture 102 which is formed into a beam by the apertures 124 and 126 to pass through the arm without significant blocking, to the mirror 60, and from the mirror 62 to the grating 58. The upper spoke 194 is fan-shaped while the lower spokes 196 and 198 are generally rectangular struts with steps 200 to clear the upper bearing 88 of the motor 42.

Connected to the rear of the hub 192 molded integrally therewith, are a pair of spaced hairpin flexures 202 and 204 with aligned holes 206. The arm 152 is made of dimensionally stable plastic material such as polycarbonate. The shape of the flexure members 202 and 204 as hairpins renders them flexible so that the section 156 can readily be installed on the champhered posts 180 and 182 by pushing them over the posts. The arms ride on the surfaces 186 and 188 and are spaced by the spacer portion of the cylinder of the journal so that they clear the board 66. When pressed over the posts, the flexures 202 and 204 expand in a direction between the motor shaft 90 and the post 182. Since the distance between the motorshaft 190 from the outside thereof which bears against the pad 192 is longer than the distance between the holes 206 and the pad when the flexures are in their relaxed or untensioned state, the flexures are expanded and the section 156 is held in tension.

The module is dimensionally stable by virtue of the unitary structure of the wall 74 and the circuit board 66 when assembled together. Bending the board is precluded by this unitary structure. Moreover, the larger or rear surface of the posts bears against the periphery of the holes 206 in the flexures and are equal or slightly less in height than the posts 180 and 182. Accordingly, the dimension between the journal 128 and the shaft 90 is precisely set. The ratio of the shaft 90 radius to the length of the arm 156 between outside of the shaft 90 where it bears against the pad 192 and the axis of rotation at the journal 128 corresponds to a pulley or gear reduction ratio, which is the ratio of these radii. The radius of the motor shaft 90 is much smaller than the radius of the arm 156 as measured between the rotation axis at the journal and the outside of the motor shaft 90. The angular inclination of the grating 58 is far less than the angular rotation of the motorshaft; thus enabling the motor to be stepped over relatively large angular displacements and yet obtain a very small angular displacement of the grating. This enables very small discrete wavelength range bins or increments to be measured. The reduction ratio is very precise throughout the range of rotation of the arm about the rotational axis at the journal 128 by virtue of the stiffness of the spokes 194, 196 and 198 and the dimensional stability and stiffness, especially in torsion and against bending of the unitary board 66 and wall 74 structure.

In order to index the grating 58 in the vertical direction, the bracket 150 and particularly the foot thereof is biased against a patch 280 of material having a low coefficient of friction, such as Teflon, which is located on the upper surface of the board 66 in the area through which the bracket moves as the arm rotates. See FIG. 3A. Accordingly, the bracket and the grating effectively makes sliding contact with the board as the arm rotates. A flat spring 282 which is bent up at its forward end 284 and preferably has a patch of Teflon on the surface thereof which bears against the top of the bracket 150 mechanically biases the bracket against the board 66. In lieu of such a mechanical biasing mechanism, electromagnetic bias may be provided by utilizing a body of magnetic material in the bracket and a magnet on the board which attract each other and maintain the sliding contact between the bracket and the board 66 for vertical indexing purposes.

Figure 8:
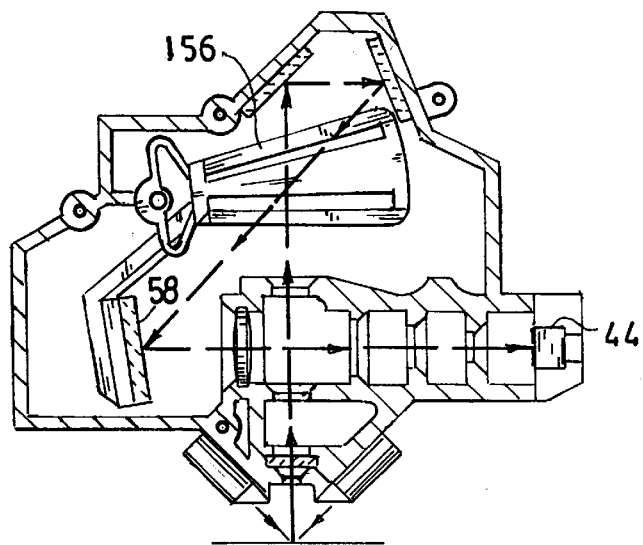
FIGS. 8, 9 and 10 are schematic diagrams of the module shown in FIG. 3 with the arm in positions for measuring spectral components in discrete spectral ranges where the wavelengths are in the blue, green and red portion of the visible spectrum, respectively.
Figure 9:
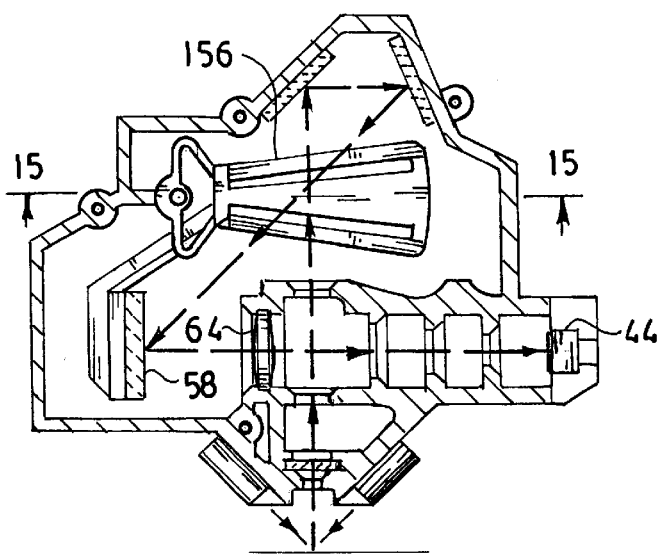
Figure 10:
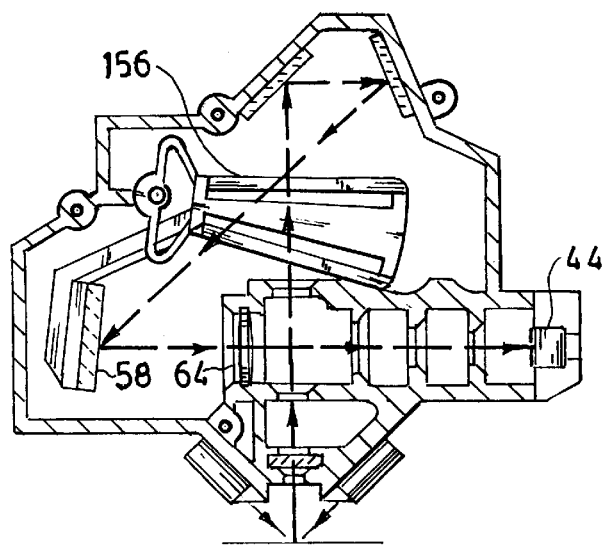
Figure 16:
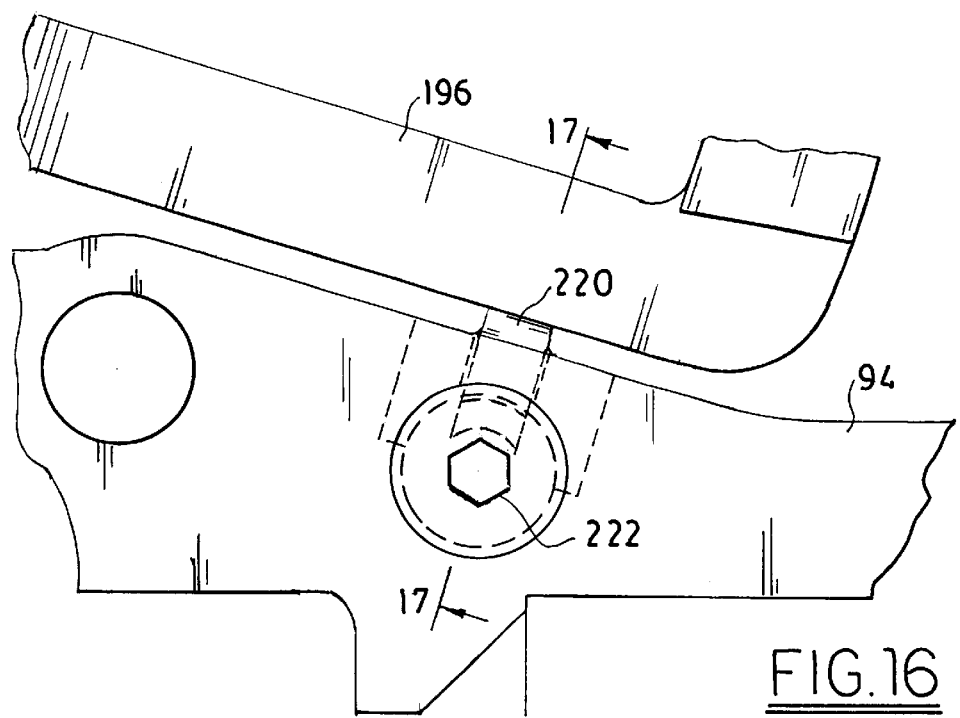
FIG. 16 is a view of the area circumscribed by the line 16—16 in FIG. 3.
Figure 17:
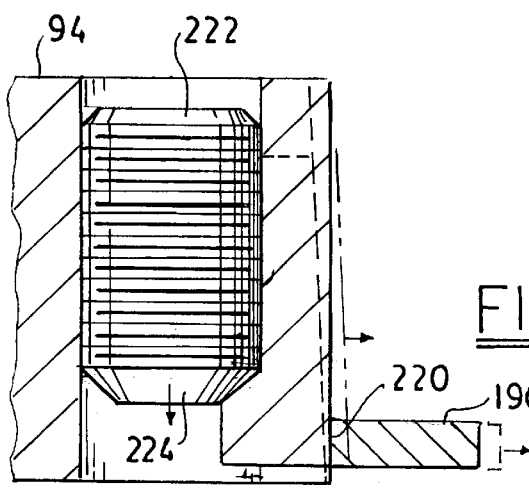
FIG. 17 is a sectional view taken along the line 17—17 in FIG. 16.

Very few adjustments are needed in the module 16. In order to index the arm in a starting position where the first increment in the longer wavelength in the red portion of the visible spectrum are measured (see FIG. 10) a flexible finger 220 which projects from a slot in the wall 94, which is the inner wall of the corridor 96 is moveable inwardly and outwardly by means of an Allen head screw 222 which bears on, a tapered or cam surface 224 at the bottom of the screw 222. The arm 156 may thus be positioned so as to measure the first See FIGS. 16 and 17 bin or range increment in the red portion of the spectrum. In making a measurement, the motor may be turned so as to bring the arm against the stop formed by the finger 220, and then proceeds to rotate the arm so that it moves to a position in discrete and angular steps to the green as shown in FIG. 9 and then to a position in the blue portion of the spectrum as shown in FIG. 8.

The photodetector 44 may also be aligned (see FIGS. 18 and 19) using a adjustment gage or fixture which sets the bottom surface 226 of the photodetector 44 off a socket in which the photodetector is mounted with the leads 228 thereof projecting through the circuit board 66 for connection to traces therein. The fixture may inserted through an opening 228 in the wall 74 (see also FIGS. 3 and 4). The wall 74 has formed therein a flexural finger 230 which is advanced or retracted by an Allen head screw 232 to clamp the photodetector in position where the image aperture or slit 126 is precisely oriented to the image of aperture 102. The finger is shown in its relaxed unextended position in FIGS. 18 and 19 and is extended by moving the screw 232 towards the board 66 to clamp the photodetector in place. After clamping the fixturing may be removed via the opening 228.

The image aperture 126 is preferably formed with a sheet 240 opaque material which may be conductive with a pressure sensitive adhesive coating. The sheet 240 has arms with folds 242. See FIGS. 12–14. A die may cut an opening 244 from which the leads 229 of the photodetector extend. The aperture 126 is formed by cutting the sheet 240 with a die which makes spaced horizontal cuts and spaced vertical cuts. The material removed leaves the slit aperture 126. The sheet arms are then folded around the photodetector 44. The sheet material then sticks to the photodetector. The material may be conductive so as provide a shield which is connected to the grounded or referenced potential lead 228 of the photodetector and thence to the grounded traces or ground plane of the board 66.

It is sometimes desirable to measure the spectrum of light through a transparency, such as a film. To that end, a pivotal foot (like foot 32 FIGS. 1 & 2) may be provided by a block 250 as shown in FIGS. 20 and 21 which as a slot 252 in which a light diffusing plate 254 and lamp 256 is disposed. The lamp may be operated by a battery 258 in a holder in the block 250. Alternatively, instead of connecting the block by snapping it over the pin 30 (FIG. 3), the slot 252 may be made deep enough so that the foot plate 32 is received therein. However it is preferred to use the block transparency holder which is snapped on the post 30 like the foot plate 32.

Figure 22:
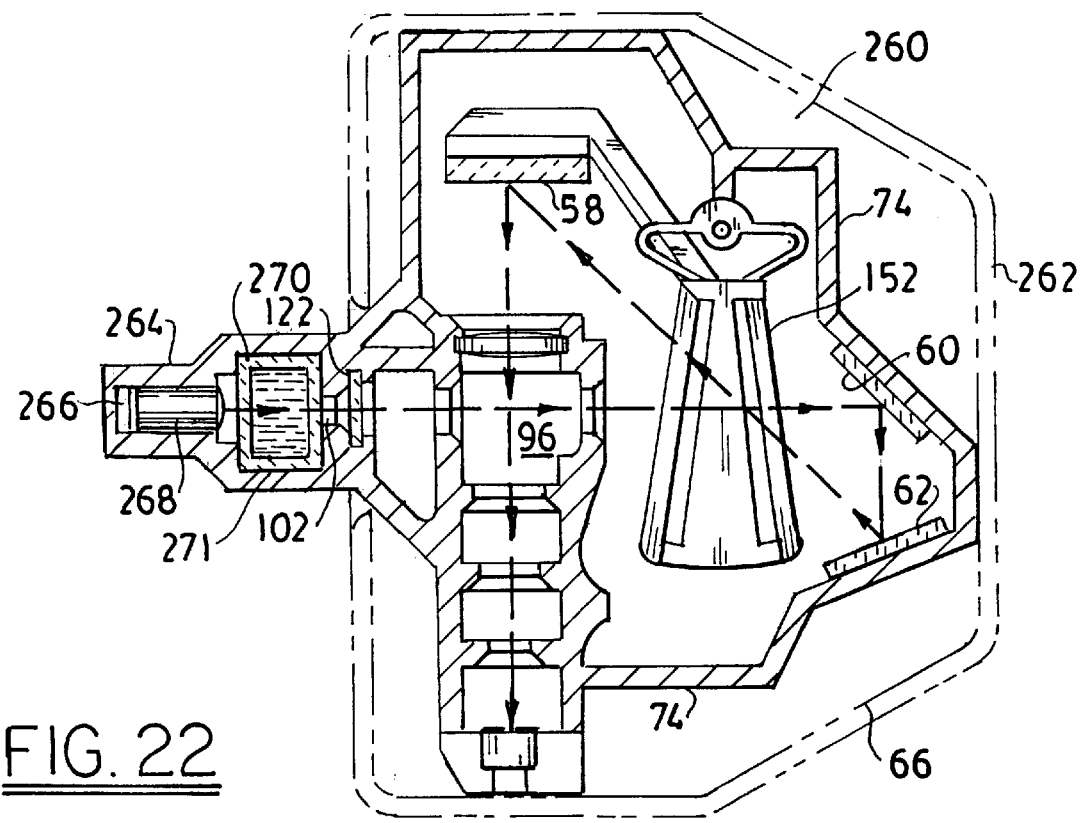
FIG. 22 is a view similar to FIG. 3 where the module is provided with a extension for containing a cuvette for containing a sample which is illuminated for measuring the spectral absorption thereof.
Figure 23:
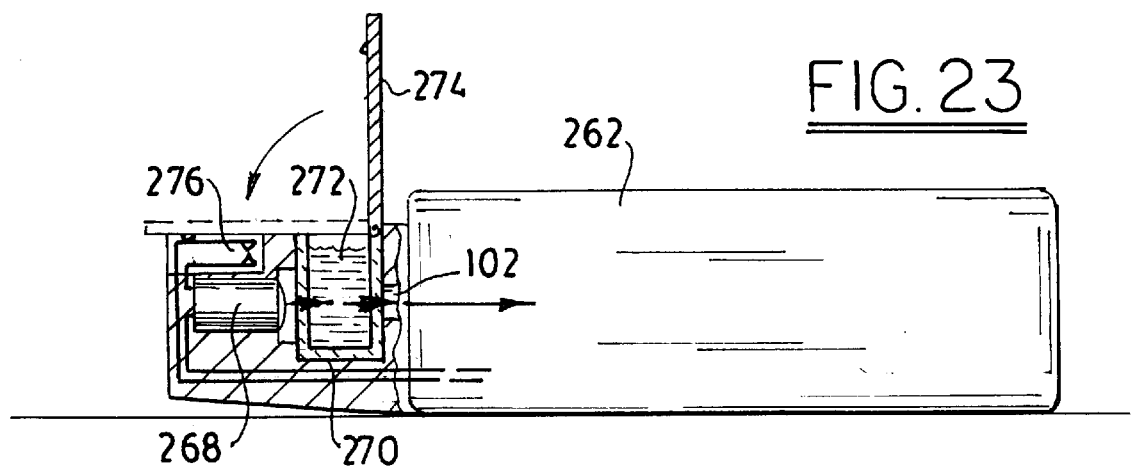
FIG. 23 is a side view of the spectrophotometer containing the module shown in FIG. 22 which shows a vertical sectional view through the extension and the cuvette.

Referring to FIGS. 22 and 23, there is shown a module 260 similar to the module 16, and like parts are identified by like reference numerals. The module 260 is disposed in a casing or housing 262. The wall 74 of the module is formed with an extension 264 having a cavity 266 containing a lamp 268. Another cavity 270 contains a cuvette 271 which holds a liquid sample 272. The spectrum of which is to be measured. The walls of the cuvette are transparent and the cuvette has an opaque cover 274 which pivots downwardly to close the cuvette 270. When its down position, as shown in FIG. 23 by the dash lines, a switch 276 is closed and the lamp is illuminated from a source of power such as the battery 56. Then light is projected through the sample 272 thence through the object aperture 102 for spectral measurements by the electrical and optical components of the spectrophotometer which may be similar to those shown in the previous figures and are identified by like reference numerals.

From the foregoing description it will apparent that there has been provided an improved electro-optical module and particularly a module which is especially suitable for use in a spectrophotometer. Variations and modifications as well as other applications for an electro-optical module accordance with the invention will undoubtedly suggest themselves to those skilled in the art. Accordingly, the foregoing description should be taken as illustrative and not in any limiting sense.

We claim:

1. An electro-optical module comprising a flexible base plate and a self supporting wall assembled to said plate on one side thereof into a unitary structure consisting essentially of said wall and plate and being more rigid than said plate and wall alone, said wall surrounding an area on one side of said plate containing a plurality of electrical and optical components and assembled relationship with at least one of said plate and said wall, whereby to enable said components to be stable when installed in an electro-optical instrument.

2. The module according to claim 1 wherein said wall has an entrance aperature for light, and said components provide a spectrophotometer for measuring the spectral components of said light.

3. The module according to claim 2 said instrument further comprising a hand holdable casing containing said module and having a forward end and a rear end, said casing having a port alignable with said entrance aperture in said forward end of said casing, said forward end having a post for receiving a holder said holder providing a support for a transparent specimen for spectral measurement, said holder being removably attached in pivotal relationship with said casing on said post, said holder having a cavity for a source of illumination, a slot in which said transparent specimen is movably disposed for displacement with respect to its said support in the path of said illumination to provide the light entering said spectrophotometer.

4. The module according to claim 3 wherein said transparent specimen is a transparency and said casing has a foot plate pivotable on said post and disposable in said slot over said transparency.

5. An electro-optical instrument comprising a casing in which there is internally disposed an electro-optical module, said module comprising a flexible base plate and a flexible self supporting wall assembled to said plate on one side thereof into a unitary structure consisting essentially of said wall on said plate and more rigid than said plate and wall alone, said wall surrounding an area on one side of said plate containing a plurality of electrical and optical components in assembled relationship with at least one of said plate and said wall which enables said components to be mounted stably in said casing.

\* \* \* \* \*